US006848647B2

(12) United States Patent
Albrecht

(10) Patent No.: US 6,848,647 B2
(45) Date of Patent: Feb. 1, 2005

(54) METHODS OF BUOYANT AND/OR SEMI-BUOYANT (BASB) VEHICLES UTILIZING BASB IN CONJUNCTION WITH PRESSURIZED FLUID STREAM JET (PJET) AND VARIOUSLY SHAPED BODIES, WINGS, OUTRIGGERS, AND PROPULSION/REPULSION CONFIGURATIONS

(75) Inventor: H. Victoria Albrecht, Mendham, NJ (US)

(73) Assignee: Testing Technologies, Inc., Mendham, NJ (US)

( * ) Notice: Subject to any disclaimer, the term of this patent is extended or adjusted under 35 U.S.C. 154(b) by 101 days.

(21) Appl. No.: 10/287,046

(22) Filed: Nov. 4, 2002

(65) Prior Publication Data

US 2004/0084565 A1 May 6, 2004

(51) Int. Cl.[7] ................................................. B64C 37/02

(52) U.S. Cl. .......................... 244/2; 244/5; 244/117 R; 114/313; 114/272; 280/1; 180/313

(58) Field of Search .......................... 244/5, 2, 117 R; 114/312, 313, 272, 273; 280/1; 180/313

(56) References Cited

U.S. PATENT DOCUMENTS

| | | | | | |
|---|---|---|---|---|---|
| 3,907,218 A | * | 9/1975 | Miller | ............................. | 244/5 |
| 3,993,268 A | * | 11/1976 | Moore | ............................. | 244/5 |
| 5,005,783 A | * | 4/1991 | Taylor | ............................ | 244/97 |
| 5,425,515 A | * | 6/1995 | Hirose | ............................. | 244/5 |
| 5,518,205 A | * | 5/1996 | Wurst et al. | ................... | 244/58 |
| 6,196,498 B1 | * | 3/2001 | Eichstedt et al. | .............. | 244/5 |
| 2003/0173454 A1 | * | 9/2003 | Brown | ........................... | 244/2 |

* cited by examiner

Primary Examiner—J. Woodrow Eldred

(57) ABSTRACT

A method wherein a vehicle is capable of movement on or over land, and/or on, over, or under water. Various body, wing, tail, and/or outrigger shapes facilitate movement and develop lift. Buoyancy or semi-buoyancy is developed utilizing various chambers to contain controlled volumes of gaseous or liquid substances. Motion is augmented by propulsion or repulsion mechanisms, including pressurized liquid stream jet (PJET) propulsion. The vehicle is capable of modifying its shape and/or the curvature of various parts, such as wings, tails, and/or outriggers, by manipulating the internal skeleton, the internal compartments supporting the external surfaces, and/or the internal pressure of the shape. Control Agents with mechanized or manual support manage the vehicle's operations controlling various movement particular information, as well as baseline algorithms, such as wind speed, currents, and location.

10 Claims, 12 Drawing Sheets

METHODS OF BUOYANT AND/OR SEMI-BUOYANT (BASB) VEHICLES UTILIZING BASB IN CONJUNCTION WITH PRESSURIZED FLUID STREAM JET (PJET) AND VARIOUSLY SHAPED BODIES, WINGS, OUTRIGGERS, AND PROPULSION/REPULSION CONFIGURATIONS

BACKGROUND OF THE INVENTION

This invention relates to vehicles capable moving at various altitudes or depths, on or over land, and/or on, over, or under water. BASB/PJET vehicles are directionally propelled or repelled with various means while utilizing various body, wing, tail, and/or outrigger configurations. BASB/PJET vehicles are managed by a Control Agent using computerized and manual controls to enable the vehicle to achieve the desired altitude or depth at the desired speed and attitude, and move from a designated starting point to a designated ending point.

BACKGROUND—DESCRIPTION OF PRIOR ART

Since man has contemplated travel there have been a number of inventions enabling the achievement of this movement. These inventions could be generally grouped as:

Land based vehicles utilizing wheels to move over [designated] pathways.

Heavier than air vehicles with fixed, movable, or flexible wings that move through the air.

Lighter than air vehicles, such as a balloons or dirigibles.

Boats of various sizes and configurations propelled across the surface of water.

Hovercraft of various configurations moving across the surfaces of land and/or water.

Submarines of various configurations moving primarily under the water.

Various forms of these land, air, and water-based vehicles are in commercial and personal use today.

Land based vehicles generally require prepared transportation links such as roads and tracks that require maintenance.

Heavier than air craft usage, while achieving general reliability requires significantly increasing resources to provide safe and controlled take-off and landing facilities. Evolving aircraft design has included increasingly efficient wing and flap design to enhance speed, lift, and safety. Many aircraft do not have the ability to slowly descend in the case of potential vehicle failure.

Balloon/dirigible vehicle functionality is being used for weather and personal use rather successfully.

Boats have evolved into many configurations using one or more wing type sails to accomplish the lift needed for controlled movement on the surface of water.

Hovercraft have evolved into various configurations used for moving over land and water at purpose built speeds.

Submarines have evolved into underwater vehicles powered by various propulsion mechanisms. They are designed however, for primarily underwater movement, generally in a cylindrical shape with guided propulsion from mechanical means, usually via a propeller to cause the underwater movement. These submarines do not use buoyancy or other means of lift, such as wings, tails, and/or outriggers to cause or augment motion.

The present invention of buoyant and/or semi-buoyant vehicles, called BASB/PJET hereinafter, provides methods of movement by bringing together the function of buoyancy, along with lift, and propulsion/repulsion, to achieve desired altitude or depth with utilization of structure, chamber configuration, and a Controlling Agent.

BASB/PJET vehicles allow for movement on and over land, and/or on, over, or under, water, using selected functionality to meet the needs of use, thus providing methods of utilizing one physical vehicle for any or all three modes of travel, at the designation of the operator or by purpose built designs.

Other inventions and conveyances such as those of U.S. Pat. No. 4,052,025 for Semi-Buoyant Aircraft require a vehicle of immense size with a fuselage of containing lighter than air gases, and shaped rather like a conventional aircraft in order to rise into the atmosphere. The invention develops a lighter than air vehicle, that cannot continue in its operation should it become heavier than air.

U.S. Pat. No. 5,645,248 identifies a Lighter than air sphere or spheroid having an aperture and pathway. Again, this is a lighter than air craft. It utilizes a pathway through which the propulsion mechanism is worked.

U.S. Pat. No. 5,941,411 utilizes an airfoil blade structure rotatable about a vertical axis comprising of upper blades and a lower blades, all having variable lift, the upper blades converging toward the lower blades from root to tip. This design is somewhat like a double-sided helicopter.

U.S. Pat. No. 6,119,983, discloses an airship/spacecraft, which, in a preferred embodiment, uses its lifting gas as fuel for thrusters, which may be of the turbo-type or rocket type, or both, to achieve transition to space flight. The airship aspect has gas-retaining structures that can withstand internal and external pressure and can change in volume and shape. This invention, discloses an airship/spacecraft that will achieve transition to space flight.

U.S. Pat. No. 6,182,924 identifies a lighter than air aircraft with a non-jettisoning ballast comprised of a liquefied lighter than air gas contained within an insulated container. The liquefied gas is vaporized and released into the lift compartment of the aircraft, which is at least partially filled with a lifting gas.

FIELD OF THE INVENTION

This invention is a method of providing buoyant and/or semi-buoyant (BASB/PJET) vehicles that enable controlled movement on or over land, and/or on, over, or under water; and to various altitudes or depths utilizing pressurized liquid stream jet mechanisms to augment movement. Various types and/or shapes of BASB/PJET vehicles may be built to serve specific purposes. As such, individual purpose built vehicles may include more or fewer features, such as seats, underwater retrieval mechanisms, or other specific mechanisms to accommodate a specific use. Thus, the types of BASB vehicles disclosed in this application are merely examples of the type of vehicles that may be constructed with this method.

The present invention provides utilizes a combination of shapes, buoyancy, lift, and propulsion/repulsion.

Other inventions indicate that the buoyant character of their invention is in itself the provider of "lift", generally by using various gases to create a "lighter than air" aircraft. The present invention uses buoyancy, not for creation of a "lighter than air" state, but to create a neutral or somewhat buoyant vehicle that uses various other methods of this invention to enable lift and movement in an environment where the motive forces can achieve desired motion with less effort.

In other inventions, gas such as Helium with a lifting capacity of 1.06 kg/M.sup.3 or 0.0660 lb/ft.sup.3 at typical sea level conditions and a 24 foot diameter balloon can lift about 455 pounds. Gas is transformed from a liquid to gaseous state, and, after the chosen flight, expelled to enable the craft to descend.

The present invention maintains controlled buoyancy chambers, and may or may not change their characteristics for starting or completing desired movement. Selected gases may be added to the buoyancy chambers, or removed, as appropriate, to maintain buoyancy, based on control algorithms. The maintenance level of buoyancy required depends on the distance from sea level, and is controlled by BASB/PJET Control Agent methodology.

Accordingly, the main object of this invention is a method of movement on or over land, and/or on, over, or under water. The method of this invention enables a vehicle to initiate movement from land, other type of platform, or water, without requiring a long runway, large fuel usage, and noise pollution. Vehicles using this method of invention could ascend or descend from airports, the tops of buildings, various ocean going craft, a backyard, or any desired land or water point of reference. Several objects and advantages of this invention are:

(a) to provide a vehicle that can achieve altitude or depth with desired movement, beginning at a designated starting point, and ending at a desired ending point, movement being managed by the vehicular Control Agent.

(b) to provide a vehicle that can ascend or descend with propulsion and/or repulsion utilizing its buoyant and/or semi-buoyant state.

(c) to provide a vehicle that embodies in its structure chambers that are capable of maintaining buoyancy. The contents of these chambers may be modified, either adding or removing buoyancy substances.

(d) To provide various body, wing, tail, and outrigger shapes that assist in the desired lift and movement of the vehicle.

References Cited [Referenced By]

U.S. Patent Documents

| | | | |
|---|---|---|---|
| 928524 | Jul., 1909 | Lake | 244/29. |
| 974434 | Nov., 1910 | Rettig | 244/125. |
| 1556459 | Oct., 1925 | Szymanski | 244/97. |
| 1567703 | Dec., 1925 | Broyles | 244/115. |
| 2091580 | Aug., 1937 | Belinski | 244/25. |
| 2365827 | Dec., 1944 | Lebert | 244/30. |
| 2606726 | Aug., 1952 | Henion | 244/50. |
| 2876969 | Mar., 1959 | Tydon et al. | 244/137. |
| 3180590 | Apr., 1965 | Fitzpatrick | 244/30. |
| 3486719 | Dec., 1969 | Fitzpatrick et al. | 244/25. |
| 6119983 | Sep, 2000 | Provitola | 244/158R |
| 2996212 | Aug, 1961 | O'Sullivan, Jr. | 244/24 |
| 3120932 | Feb., 1964 | Stahmer | 244/24. |
| 4012016 | Mar., 1977 | Davenport | 244/97. |
| 4032085 | Jun., 1977 | Papst | 244/30. |
| 4119052 | Oct., 1978 | Rinaldi | 114/264. |
| 4228789 | Oct., 1980 | Shinozuka | 114/342. |
| 4730797 | Mar., 1988 | Minovitch | 244/159. |
| 4773617 | Sep., 1988 | McCampbell | 244/24. |
| 4850551 | Jul., 1989 | Krawetz | 244/97. |
| 5005783 | Apr., 1991 | Taylor | 244/97. |
| 5012640 | May., 1991 | Mirville | 60/246. |
| 5348251 | Sep., 1994 | Ferguson | 244/30. |
| 5348254 | Sep., 1994 | Nakada | 244/26. |

BRIEF SUMMARY OF THE INVENTION

This invention is a method that provides vehicles capable of moving at various altitudes or depths, on or over land, and/or on, over, or under water. The BASB/PJET vehicles are directionally propelled or repelled with various means while utilizing various body and wing or outrigger type configurations. BASB/PJET vehicles are managed by a Control Agent using computerized and manual controls to enable the vehicle to achieve the desired altitude or depth at the desired speed and attitude, and move from a designated starting point to a designated ending point.

A purpose built BASB/PJET vehicle can and may more specifically carry out the particular reason for which it was designed. The shapes shown in the description of this invention herein, therefore, serve only to provide examples of the types of structures that may be utilized and the method of this invention may be utilized in a plurality of various additional shapes and a plurality of purpose built structures. BASB/PJET vehicles contain compartments housing various fuel, buoyancy and/or repelling factors, passengers, cargo, and propulsion mechanisms. BASB/PJET vehicles also utilize various shapes, including wing and outrigger forms to affect lift and/or vehicular stabilization.

A direct line of movement at chosen speeds from start to finish may be accomplished with, or without, the use of special travel paths, or takeoff and landing arrangements, such as runways, roads, or water channels. BASB/PJET vehicles perform the functions of aircraft, hovercraft, boats, and submarines providing versatility and a wide spectrum of uses.

BRIEF DESCRIPTION OF THE DRAWINGS

This invention is a method that provides vehicles capable of moving at various altitudes or depths, on or over land, and/or on, over, or under water. BASB/PJET vehicles are directionally propelled or repelled with various means while utilizing various body, wing, tail, or outrigger type configurations. BASB/PJET vehicles are managed by a Control Agent using computerized and manual controls to enable the vehicle to achieve the desired altitude or depth at the desired speed and attitude, and move from a designated starting point to a designated ending point.

As such, individual purpose built vehicles may include more or less features, such as seats and/or cargo space to accommodate a specific purpose built use and the drawings disclosed herein are merely examples of the BASB/PJET functionality.

REFERENCE TO DRAWINGS

Figure 1:
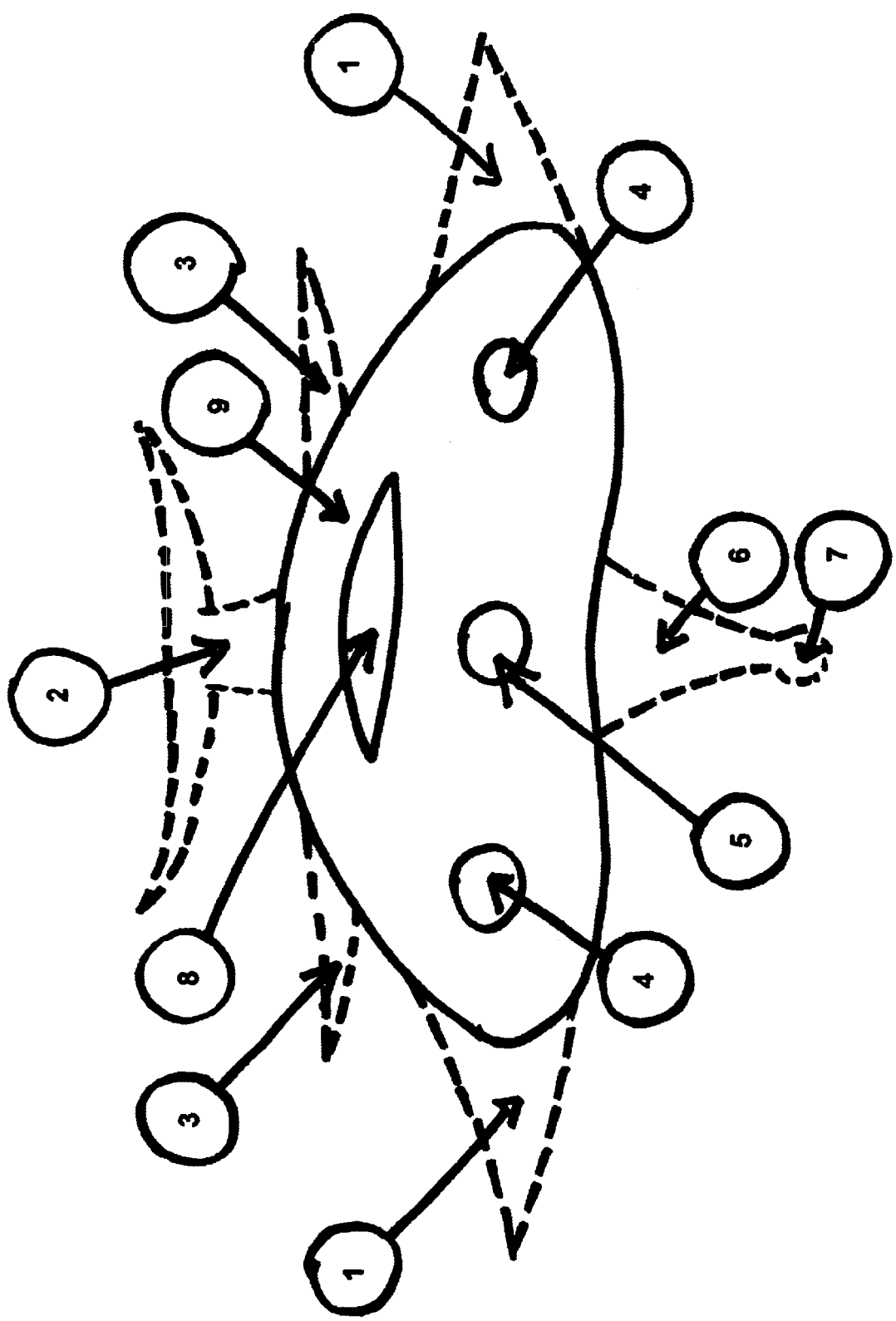
FIG. 1 is a front and side view of one example of BASB/PJET configurations.
Figure 2:
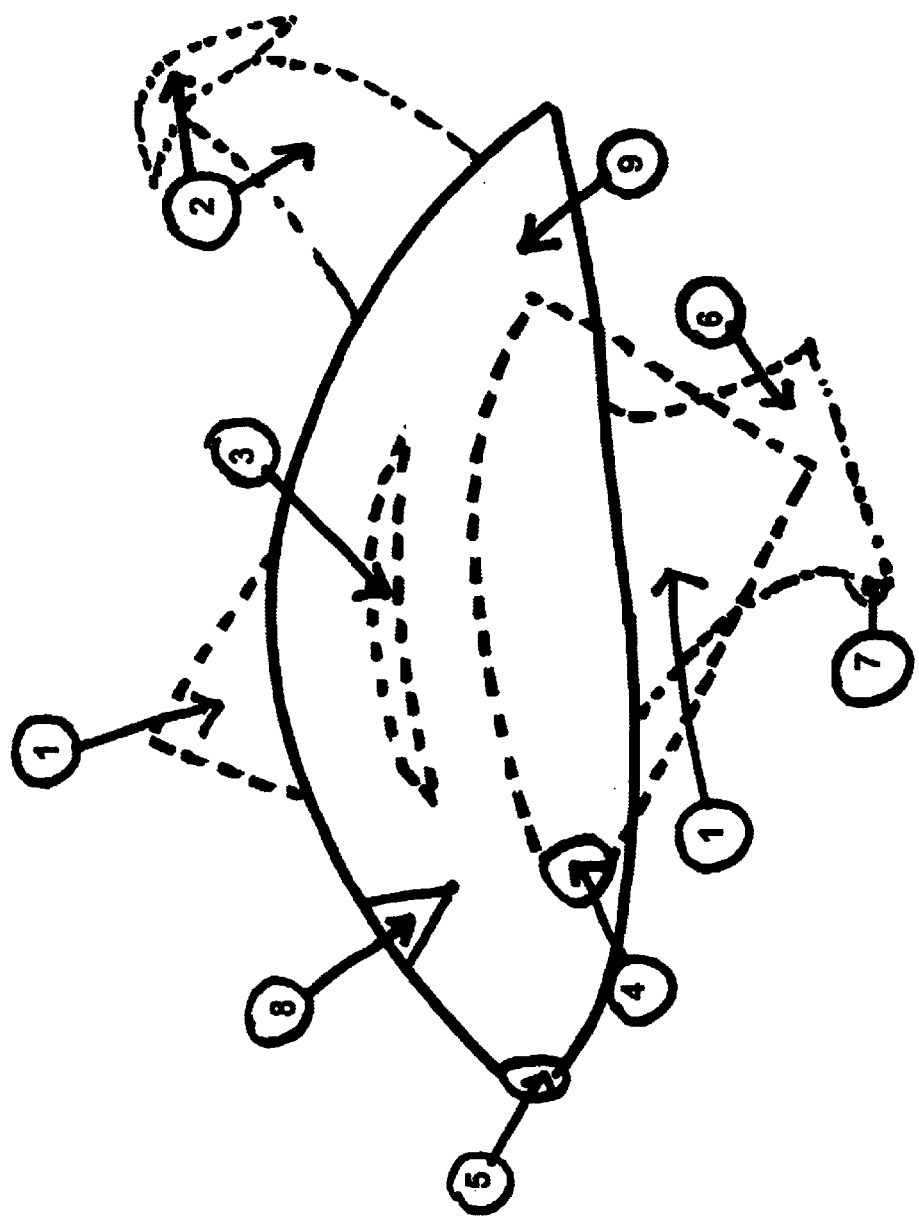
FIG. 2 is a top view of the vehicle described in FIG. 1.
Figure 3:
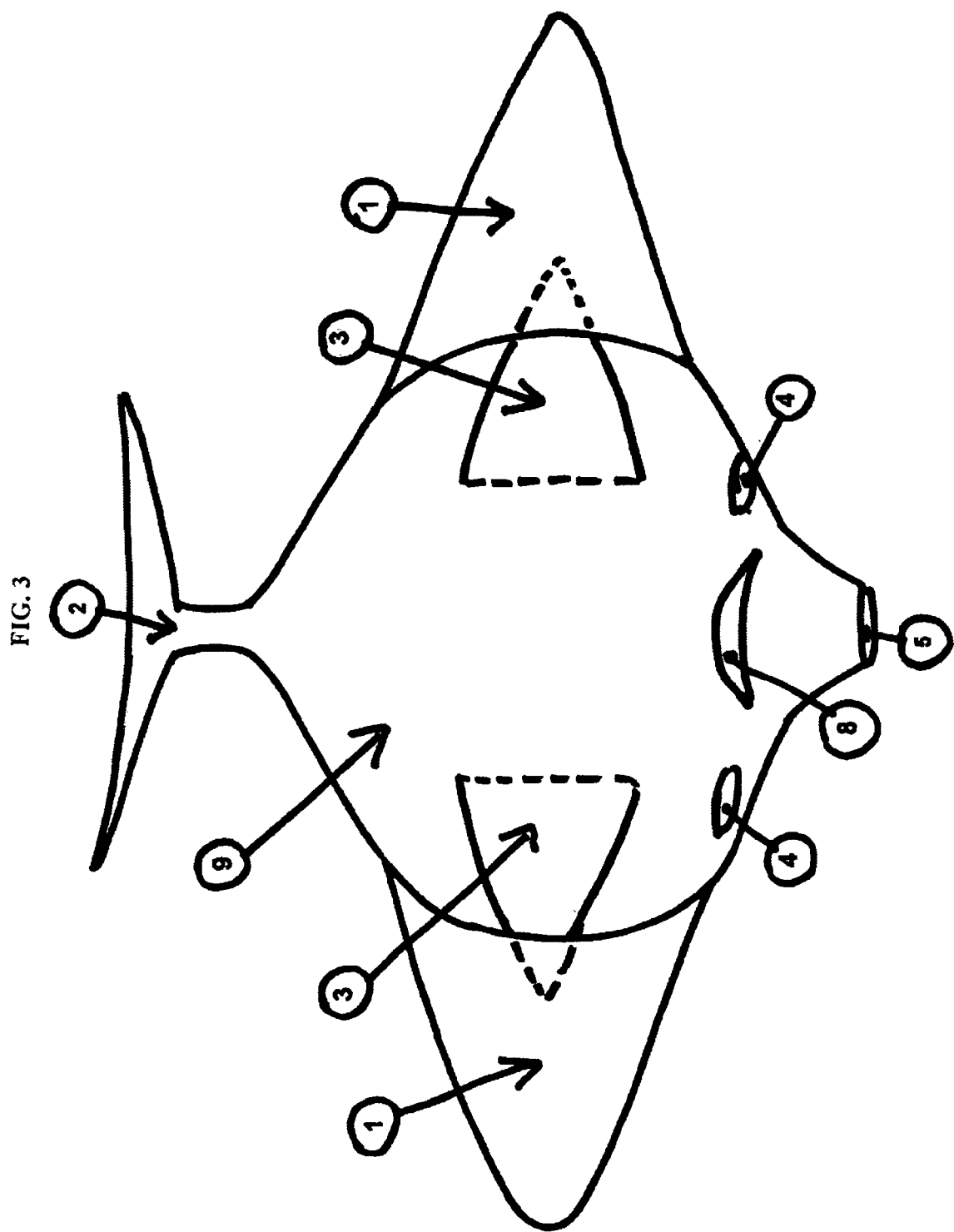
FIG. 3 is a front view of a second example of the use of outriggers and PJET.
Figure 4:
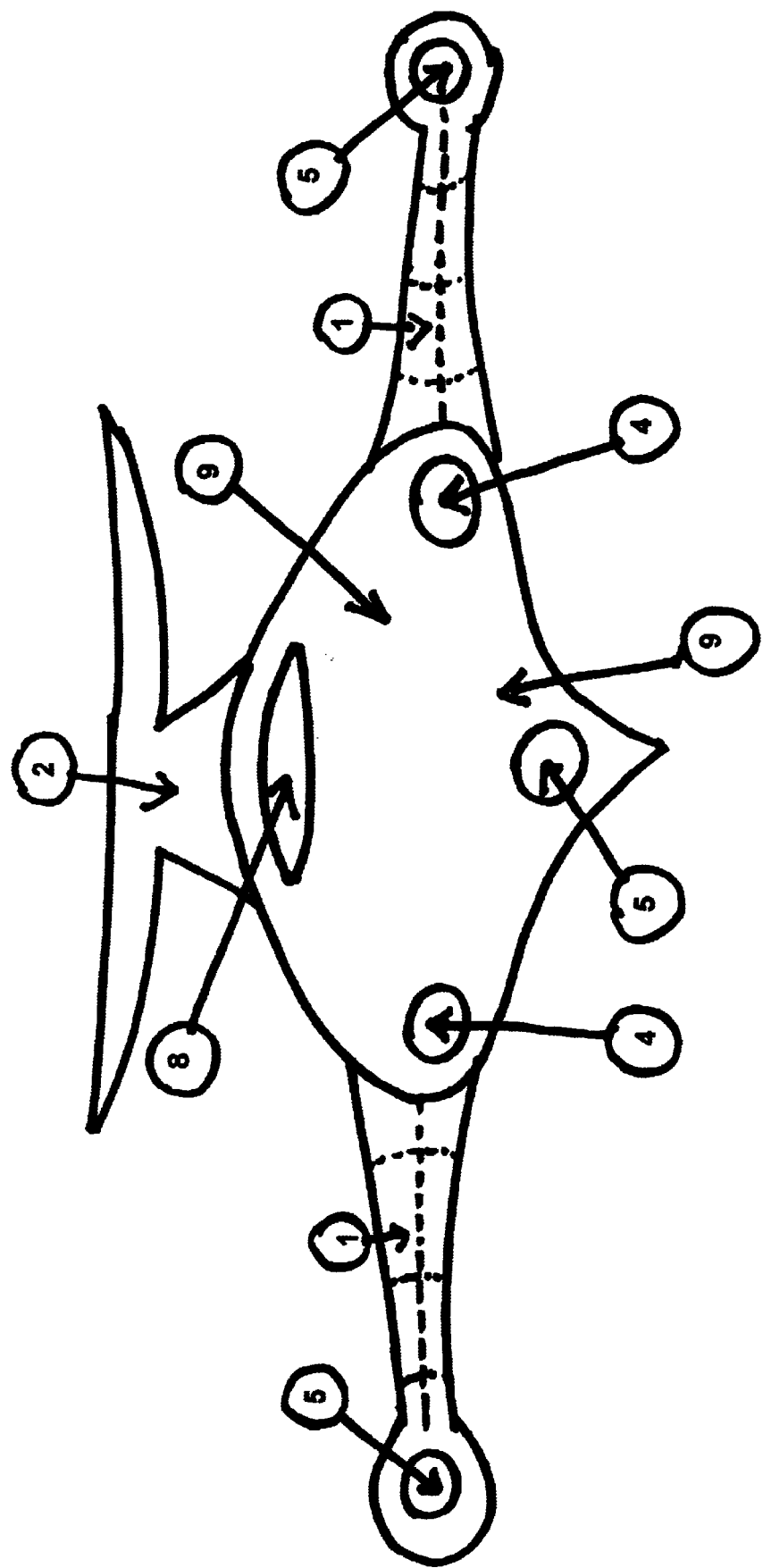
FIG. 4 is a quarter view of a third example of BASB/PJET configurations. This vehicle includes larger cargo holds, and less area for the transport of passengers.
Figure 5:
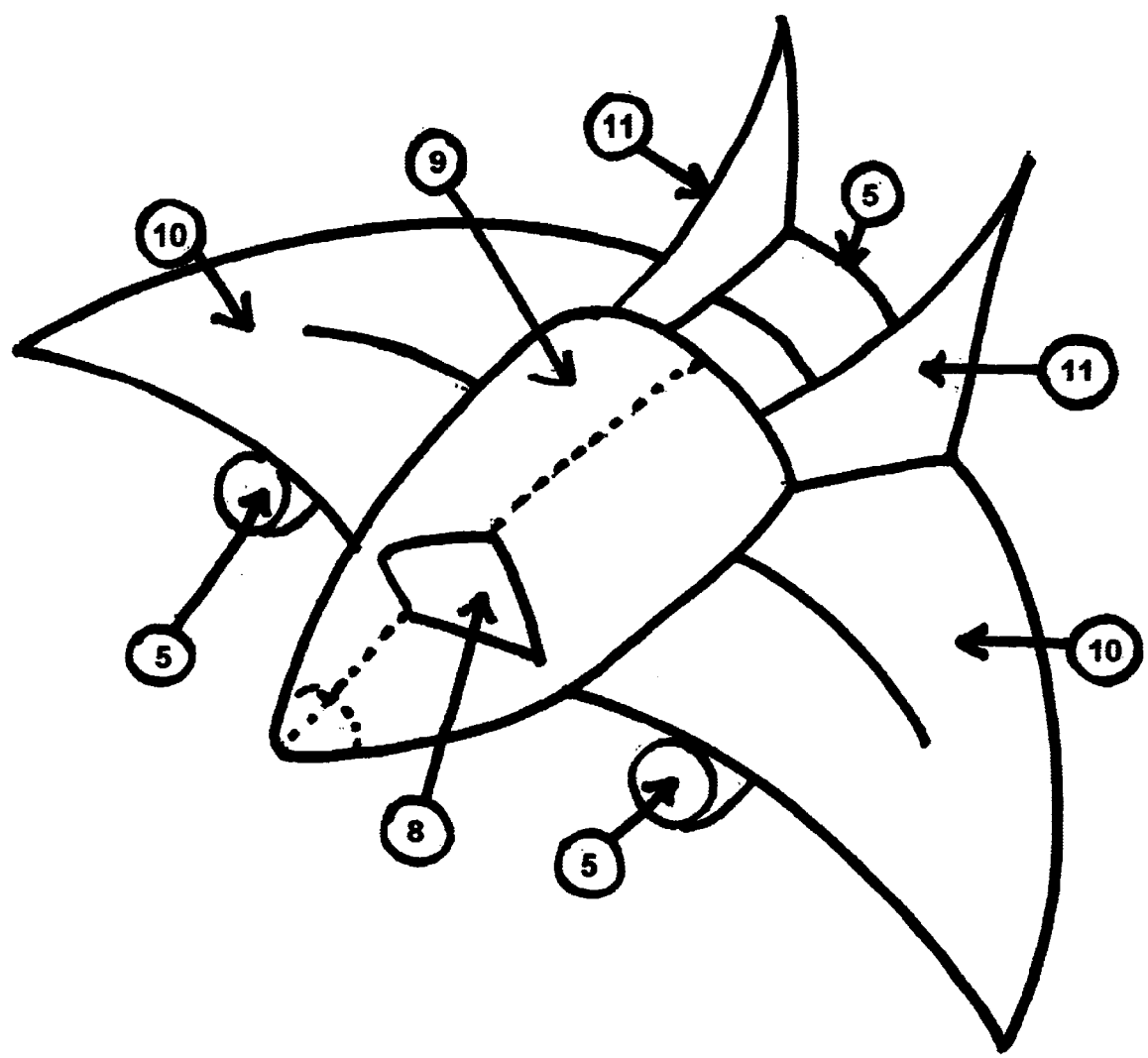
FIG. 5 is a quarter view of a fourth example of BASB/PJET configurations. This vehicle includes larger passenger compartment, and less area for the transport of cargo.
Figure 6:
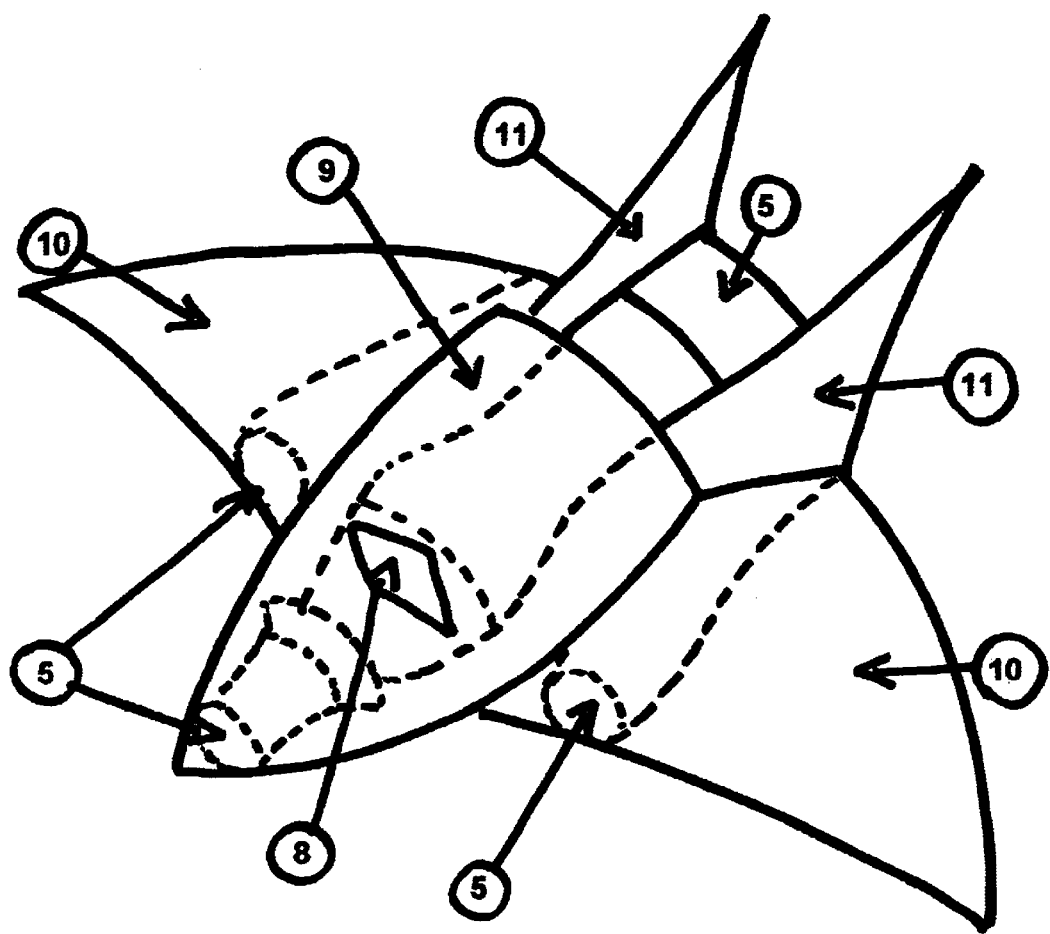
FIG. 6 is a quarter view of a fifth example of BASB/PJET configurations. This vehicle is a unified main body with integral flexible wings and a large configuration of the natural PJET.
Figure 7:
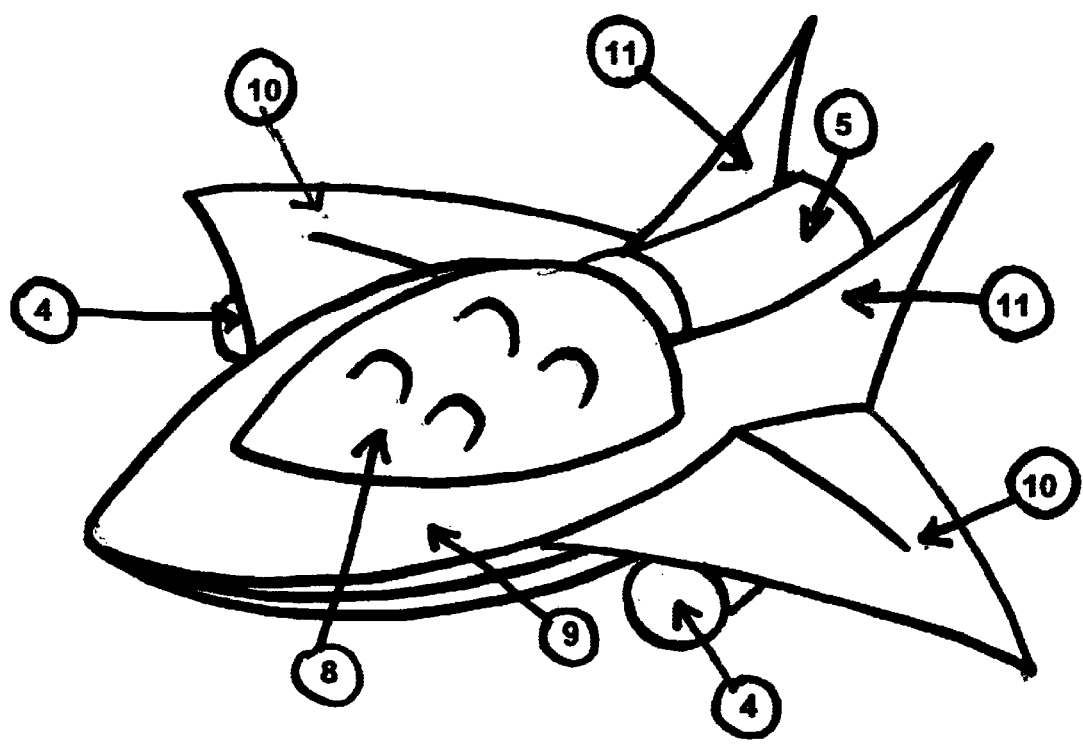
FIG. 7 is a bottom view of the example in FIG. 6 showing an example of the shape of the natural stream PJET.
Figure 8:
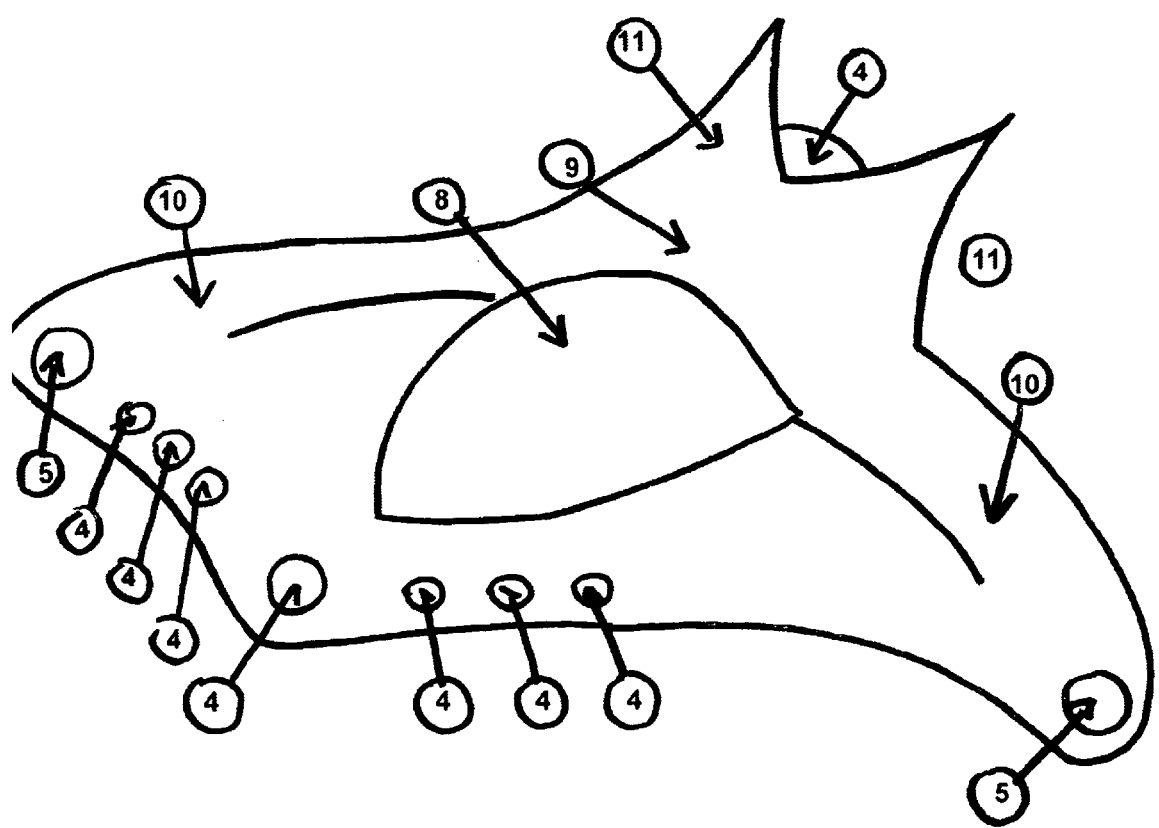
FIG. 8 includes views of wing configurations, including the camber setting and curve/flex mechanisms
Figure 9:
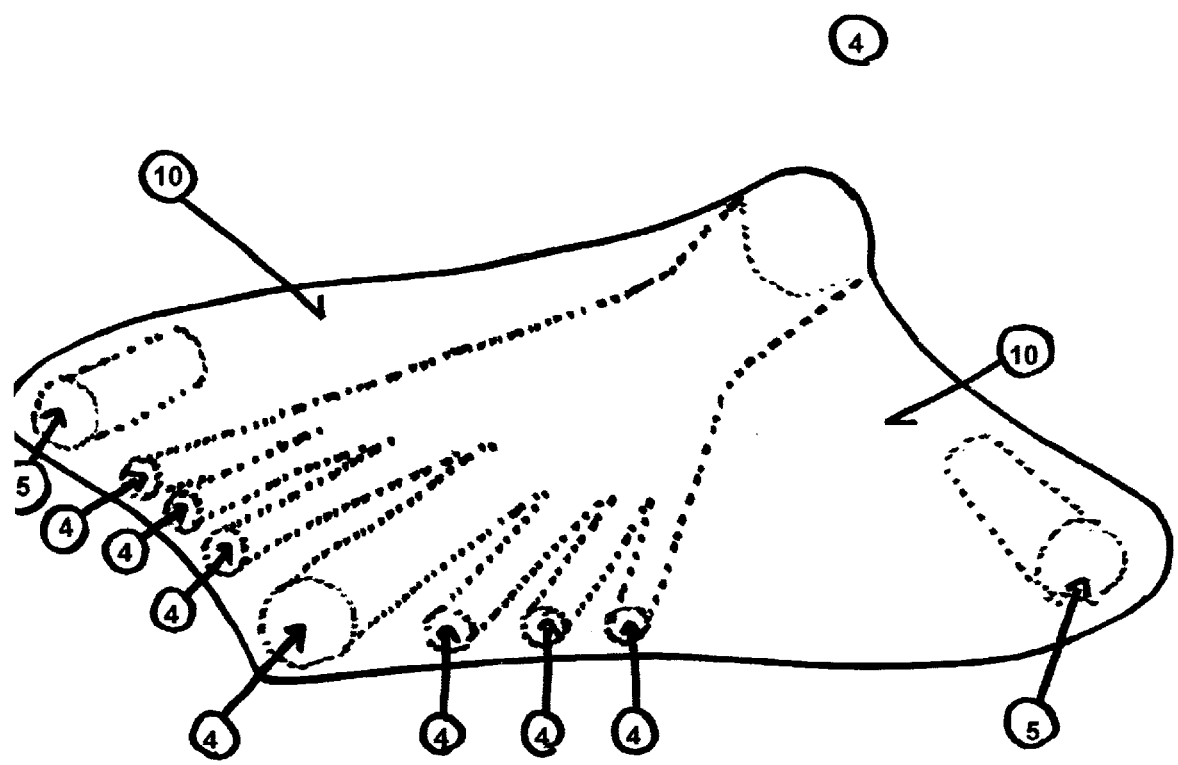
FIG. 9 is another view of the wing, including the skin of the wing and the inner compartments.
Figure 10:
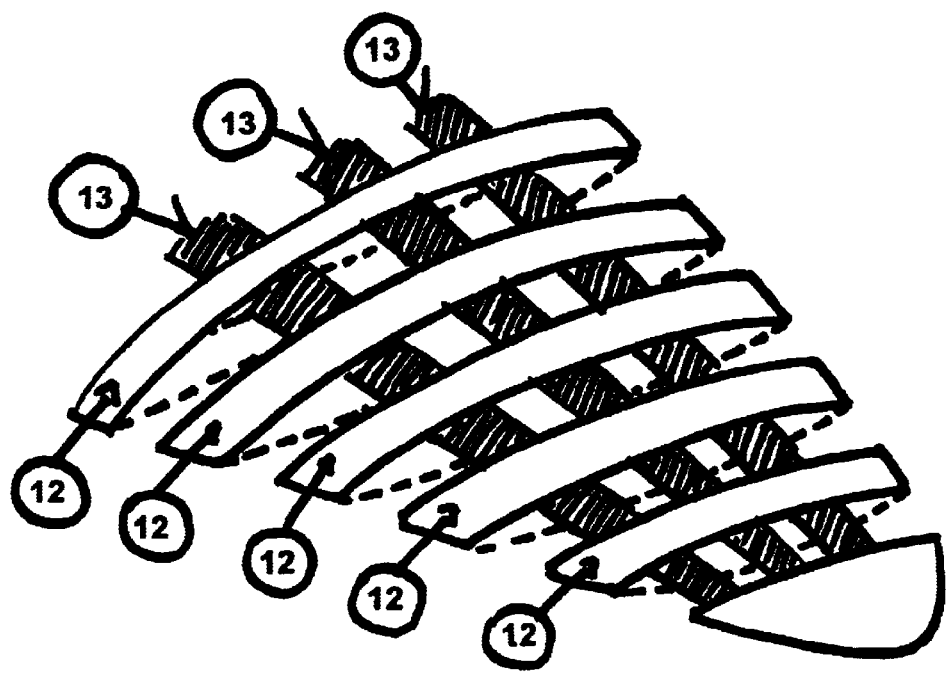
FIG. 10 is a view of the interior of an example of a wing shaped compartment.
Figure 11:
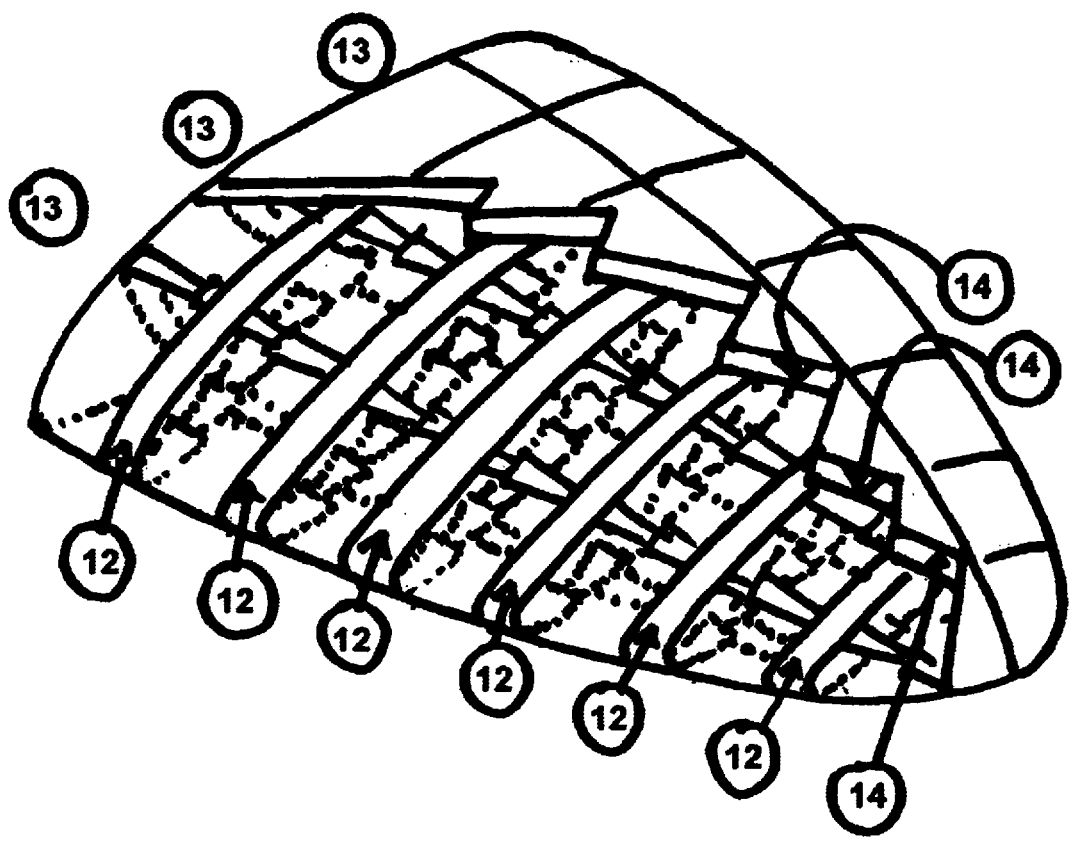
FIG. 11 contains a view of three examples of vehicles with the Buoyancy Input Slot.
Figure 12:
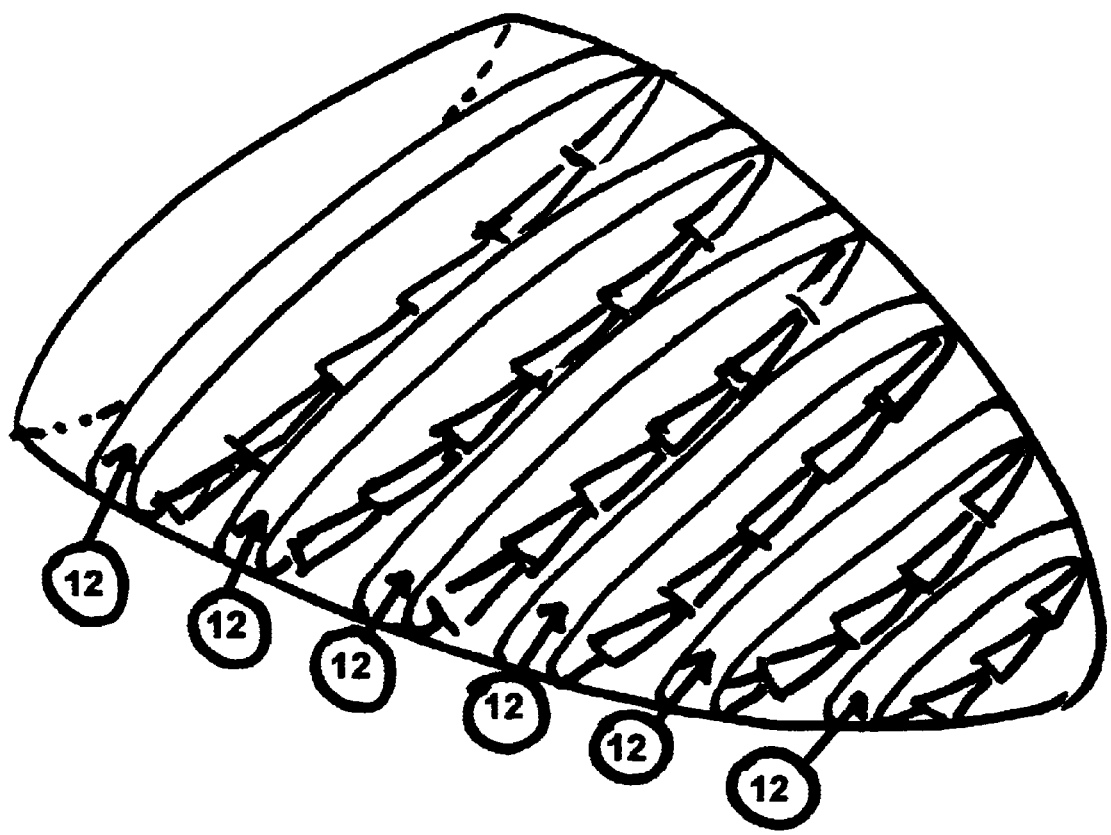
FIG. 12 contains a view of an example of the Buoyancy Regulator Rollers and end flaps.

| Reference Numerals | Drawing Cross Reference |
|---|---|
| 1 | FIG. 1 Item 1 Retractable or Permanent Wing and/or Wing Outrigger |
| 2 | FIG. 1 Item 2 Retractable or Permanent Tail and/or Tail Outrigger |
| 3 | FIG. 1 Item 3 Retractable or Permanent Adjustable Centerboard |
| | FIG. 1 Item 4 Entry and Compartment for PJET |
| 5 | FIG. 1 Item 5 Rotating and/or Directional Engines |
| 6 | FIG. 1 Item 6 Centerboard Counterweight |
| 7 | FIG. 1 Item 7 Cockpit Compartment Window |
| 8 | FIG. 1 Item 8 Main Vehicle Body |
| 9 | FIG. 2 Item 1 Retractable or Permanent Wing and/or Wing Outrigger |
| 10 | FIG. 2 Item 2 Retractable or Permanent Tail and/or Tail Outrigger |
| 11 | FIG. 2 Item 3 Retractable or Permanent Adjustable Centerboard |
| 12 | FIG. 2 Item 4 Entry and Compartment for PJET |
| 13 | FIG. 2 Item 5 Rotating and/or Directional Engines |
| 14 | FIG. 2 Item 7 Cockpit Compartment Window |
| 15 | FIG. 2 Item 8 Main Vehicle Body |
| 16 | FIG. 3 Item 1 Retractable or Permanent Wing and/or Wing Outrigger |
| 17 | FIG. 3 Item 2 Retractable or Permanent Tail and/or Tail Outrigger |
| 18 | FIG. 3 Item 4 Rotating and/or Directional Engines |
| 19 | FIG. 3 Item 5 Entry and Compartment for PJET |
| 20 | FIG. 3 Item 7 Cockpit Compartment Window |
| 21 | FIG. 3 Item 8 Main Vehicle Body |
| 22 | FIG. 4 Item 4 Rotating and/or Directional Engines |
| 23 | FIG. 4 Item 5 Entry and Compartment for PJET |
| 24 | FIG. 4 Item 7 Cockpit Compartment Window |
| 25 | FIG. 4 Item 8 Main Vehicle Body |
| 26 | FIG. 4 Item 9 Permanent Wing |
| 27 | FIG. 4 Item 10 Permanent Tails |
| 28 | FIG. 4 Item 11 Cargo Underbody |
| 29 | FIG. 5 Item 4 Rotating and/or Directional Engines |
| 30 | FIG. 5 Item 5 Entry and Compartment for PJET |
| 31 | FIG. 5 Item 7 Cockpit Compartment Window |
| 32 | FIG. 5 Item 8 Main Vehicle Body |
| 33 | FIG. 5 Item 9 Permanent Wing |
| 34 | FIG. 5 Item 10 Permanent Tails |
| 35 | FIG. 6 Item 4 Rotating and/or Directional Engines |
| 36 | FIG. 6 Item 5 Entry and Compartments for PJET |
| 37 | FIG. 6 Item 7 Cockpit Compartment Window |
| 38 | FIG. 6 Item 8 Main Vehicle Body |
| 39 | FIG. 7, all Items 5 Large PJET Assembly |
| 40 | FIG. 8 Items 12 Wing shape and camber adjustment assembly |
| 41 | FIG. 8 Items 13 Wing extension assembly |
| 42 | FIG. 9 Item 1 Wing exterior |
| 43 | FIG. 9 Items 12 Wing shape and camber adjustment assembly |
| 44 | FIG. 9 Items 13 Wing extension assembly |
| 45 | FIG. 9 Items 14 Surface Pressurized Compartments |
| 46 | FIG. 10 describes a sample of a wing assembly, and is also exemplar of surface structures of other parts such as main body, tail, and outriggers |
| 47 | FIG. 10 Item 1 Example of a wing assembly |
| 48 | FIG. 10 Item 12 Wing shape and camber adjustment |
| 49 | FIG. 10 Item 14 Surface Pressurized Compartments |
| 50 | FIG. 10 Item 15 Internal Compartment Surface Containing Membrane |
| 51 | FIG. 11 Items 16 Buoyancy input slot |
| 52 | FIG. 12 Item 1 Main Body side view |
| 53 | FIG. 12 Items 16 Buoyancy input Slot |
| 54 | FIG. 12 Items 17 Buoyancy Regulator rollers |

DETAILED DESCRIPTION OF THE INVENTION

BASBPJET vehicles utilize the concept of controlled buoyancy in conjunction with lift, repulsion, and/or propulsion to move through, closer, further away, or parallel, to land, objects, or water, relative to a base or point. Various methods of stabilization and propulsion control the direction and speed of the vehicle.

BASB/PJET vehicles utilize various shapes to support movement, control, and stability of the vehicle. These shapes include wing shapes, tail shapes, outrigger shapes, and devices within these shapes and the main structure to structurally control lift and direction. The Control Agent may change the shape of the skeletal infrastructure, by extending or retracting the adjustable camber and curvature stretchers, then each changed shape assumes a modified shape according to calculated requirements that will alter the lift, attitude, and movement of the vehicle.

The vehicles in the drawings are examples of the types of shapes that may be used to support BASB movement and vehicles comprised of other combinations of the BASB/PJET components will also deliver the BASB/PJET functionality.

Lift on BASB/PJET vehicles is facilitated by buoyancy, PJETs, wings, and forward motion. The vehicles in FIGS. 1, 2, and 3, utilize extendable wings and/or outriggers particularly as secondary support wings.

On the vehicles in FIGS. 1 and 2, lift is facilitated by wings that have controlled shape, while being flexible and able to be modified by computer or manual controls to achieve the desired lift according to the particular conditions at the time of motion. Rather than connected hinged 'flaps', these wings alter their shape based upon calculated algorithms that control reshaping the curvature of the wings, tails, and outriggers as appropriate to achieve the desired lift and motion. Further, the wings may be extended or retracted with concurrent curving and flexing to effect a continuous repeating motion, in a somewhat up and down movement.

The split tail in FIGS. 4 and 5, Items 10 stabilizes these vehicle examples, and works in conjunction with the tail PJET to facilitate stability.

The plurality of body shapes, such as the examples in FIGS. 1, 2, 3, 4, 5, and 6, Items 8 of the vehicles, assist in developing lift, buoyancy, stability, and forward motion because their shapes are aerodynamically structured.

The plurality of centerboard shapes, with an example in FIG. 1 Item 3 can be extended or retracted to provide stability to the vehicle and particularly to aid in minimizing and/or preventing sideward slippage. Additional weight may be added at the bottom of the centerboard.

The canopy cover Item 7 in FIGS. 1, 2, 3, 4 5, and 6, is connected to hinging mechanisms. The doors open and close to allow entry and exit of passengers and storage of cargo, as well as create an air and water, and pressure tight seal when the doors are closed.

The engines of the examples of vehicles in FIGS. 1,2,3, and 4, Items 4 may be rotated by the Control Agent, or manually, to achieve a desired directional motion. The effort of the engines is coordinated with control of the buoyancy, wing lifting, and PJET to achieve maximum effect.

The engines of the example vehicle in FIG. 5 Items 4 may be extended and/or rotated to achieve a desired directional motion. This rotation is controlled by on board computers. The effort of the engines is coordinated with the buoyancy and wing lifting algorithms to achieve maximum effect.

The motive force shown in FIGS. 1, 2, 3, 4, 5, 6, & 7, item 5 is a an integral part of this invention. This means of propulsion uses the natural fluid stream, part of which is created by the other means of motion of the vehicle. This natural fluid stream enters the PJET through the front opening and develops higher pressure which develops a higher velocity thrust when the fluid stream is finally expelled out of the aft aperture of the PJET.

The vehicle underbody, as in the example of Item 11 in FIG. 4 is compartmentalized to hold engine fuel. Lighter than air gas for buoyancy is also compartmentalized in Item 4 in various compartments based upon calculated buoyancy algorithms that use the weight of the craft and its cargo and occupants. Extra gas for buoyancy may also be stored in the craft to be used based upon in flight computer algorithms. The underbody is designed principally to carry a heavier weight of cargo and has a larger storage area for this purpose.

At a controlled neutral or slightly buoyant state, the vehicle will be propelled with minimal fuel, changing altitude or depth. When this controlled buoyant state, changing to reach the desired ending point, is combined with movement at the desired attitude and speed, the desired motion path may be achieved.

The bottom of the underbody of the main body of the vehicles, specifically noted in the examples of FIG. 4 Item 11, and FIG. 5, contains a chamber, or chamber containing compartments, lining the bottom of the body and extending from the front to the back of the body. Under water, when descent is the object, the front lip of the buoyancy slot opens and water is allowed to enter the chamber and/or its compartments until the desired negative buoyancy is achieved. At such time that a more positive buoyancy is required the Buoyancy Regulator rollers that are in sequence with sealing flaps at either end of the rollers and fill the height of the chamber or compartments are activated and rolled, or moved towards the now opened aft exit valves, expelling water until the appropriate buoyant state is achieved. Once the state is achieved, the aft exit valves(s) are closed, retaining the then existing amount of water and buoyancy level.

The bottom of the underbody of the main body of the vehicles, specifically noted in the examples of FIG. 4 Item 11, and FIG. 5, contains a chamber, or chamber containing compartments, lining the bottom of the body and extending from the front to the back of the body. Above water, when ascent is the object, valves or connecting mechanisms allow lighter than air gas, or created vacuums to fill the chamber and/or its compartments until the desired positive buoyancy is achieved. At such time that a less positive buoyancy is required the Buoyancy Regulator rollers which are in sequence and fill the height of the chamber or compartments are activated and rolled, or moved towards the now opened aft exit valves, lowering the gaseous or vacuum pressure, and expelling gaseous substances, if appropriate, until the appropriate buoyant state is achieved. Once the state is achieved, the aft exit valves(s) are closed, retaining the then existing buoyancy level.

BASB/PJET vehicles may extend outrigger type devices shown in examples of FIGS. 1, 2, and 3, Items 1 to aid in stability. Extension of these outriggers is controlled by the Control Agent, or manually if necessary, and the extension or retraction is coordinated with the buoyancy and wing lifting algorithms to achieve maximum effect.

BASB/PJET Control Agents manage the apparent weight of the craft by regulating buoyancy. Buoyancy, including semi-buoyancy, is modified and maintained by adding or subtracting gaseous or liquid substances to or from buoyancy chambers. The initial, and subsequent levels of buoyancy in said chambers, are continuously monitored and controlled by computer programs using buoyancy transfer protocols and initiating mechanical and electrical means. The Buoyancy Chambers are capable of maintaining the desired buoyancy level and can be set to, or changed to, specific levels.

What I claim as my invention is:

1. A vehicle capable of controlled movement on and over land, and on, over, and under water, comprising;
   the vehicle;
   a rigid body connected to wings, tails, and outriggers;
   a means of creating vehicular buoyancy by a use of interconnected internal compartments;
   a means of regulating a buoyant state in said vehicle by a movement of gaseous or liquid matter between said interconnected internal compartments;
   wherein said interconnected internal compartments incorporate entry and exit regulating mechanisms.

2. A vehicle capable of controlled movement on and over land, and on, over, and under water comprising, as defined in claim 1, said wings of said vehicle further comprised of:
   internal skeletal structures that assist in maintaining and changing the curvature of said wings;
   wherein said internal skeletal structures of said wing sections may be manipulated by a control agent to change the positioning of said internal skeletal structures, resulting in the ability of said vehicle to modify its aspect and attitude for the purposes of modifying lift and momentum;
   wherein the curving and flexing of said wings may be controlled to effect a continuous repeating motion.

3. A vehicle capable of controlled movement on and over land, and on, over, and under water comprising, as defined in claim 1, said tails, and outriggers of said vehicle further comprised:
   wherein said tails and outriggers may be manipulated by a control agent to change their positioning relative to said body of said vehicle, resulting in said ability of said vehicle to modify its aspect and attitude for the purposes of modifying lift and momentum.

4. A vehicle capable of controlled movement on and over land, and on, over, and under water comprising, as defined in claim 1, said wings and tails further comprised of;
   a means of providing for different wing and tail lengths to perform a desired function, whether in air or water;
   wherein each wing or tail consists of one or more fixed sections physically and mechanically linked together;
   wherein each fixed wing or tail section fits into the next, with the main section closest to said body and serving as the anchoring component;
   wherein a means to slide one or more wing or tail sections from said anchoring component base position, horizontally and parallel to the furthermost edge of the next section and fix said section to form a semi-rigid wing or tail structure;
   wherein said internal skeletal structures of said wing sections slide out as part of each said wing section while maintaining a fixed and connected position in relationship to the total wing structure.

5. A vehicle capable of controlled movement on and over land, and on, over, and under water comprising, as defined in claim 1, said outriggers further comprised of;
   a means of providing for different outrigger lengths to perform a desired function, whether in air or water;

wherein each outrigger may consist of one or many fixed sections mechanically linked together;

wherein each fixed outrigger section may consist of one or many fixed compartments;

wherein each outrigger section fits into the next, with the section closest to said body serving as an outrigger anchoring component;

wherein a means to slide various outrigger sections from said outrigger anchoring component, horizontally and parallel to the furthermost edge of the next section and fix said section to form a rigid outrigger structure.

6. A vehicle capable of controlled movement on and over land, and on, over, and under water comprising, as defined in claim 1, said vehicle further comprised of:

operating functions managed by control agents;

wherein said operating functions comprise: identifying the starting and ending point of any movement of said vehicle; the path said vehicle will take from the starting to the ending point; external conditions of air, land, and water along the path; the time desired for said vehicle to move from said starting to ending point; regulating said buoyancy of said vehicle, managing the loaded weight of said vehicle; managing fuel levels, gaseous levels and compression; managing the direction, speed, and path of said vehicle;

wherein said control agents consist partly of computer programs and partly of electrical and mechanical components;

wherein said control agents conduct continuous diagnostics and report status;

wherein said control agents operate in a mirroring mode, with the ability to utilize multiple control agents simultaneously, or switch from one to another, should any malfunctions limit the ability of one or more of said control agents;

wherein said controls agents communicate with an operator onboard or at a remote location;

wherein said control agents manipulate the movement of gaseous or liquid matter to and from compartments in said body, wings, and outriggers;

wherein said control agents manage the functions of said internal skeletal structures;

wherein said vehicle contains manual controls that an operator may utilize to control said vehicle; said manual controls may operate alone or in concert with said control agents.

7. A vehicle capable of controlled movement on and over land, and on, over, and under water comprising, as defined in claim 1, said vehicle further comprised of:

a means of motive forces;

wherein said motive forces raise and lower said vehicle from one elevation to another;

wherein said motive forces propel said vehicle in combination with said wings, tails, and outriggers, producing thrust, lift, descent, yaw, and pitch;

wherein said motive forces may be moved, raised, lowered, and rotated relative to their positioning and attachment to said body, wings, tails, or outriggers of said vehicle, enabling said motive forces to develop desired directional movement.

8. A vehicle capable of controlled movement on and over land, and on, over, and under water comprising, as defined in claim 7, said vehicle further comprising:

a means of propulsion utilitizing one or more natural fluid streams;

wherein a shaped device pressurizes said natural fluid streams, said device hereinafter called a PJET, is attached to said body and aids and assists in developing thrust;

wherein a natural fluid stream is directed into and is pressurized by said PJET, and the now higher pressured fluid stream is expelled from an aft aperture of said PJET.

9. A vehicle capable of controlled movement on and over land, and on, over, and under water comprising, as defined in claim 7 said vehicle further comprising:

a means of propulsion utilitizing one or more natural fluid streams;

wherein a PJET, is attached to said wings and aids and assists in developing thrust;

wherein a natural fluid stream is directed into and is pressurized by said PJET, and the now higher pressured fluid stream is expelled from an aft aperture of said PJET.

10. A vehicle capable of controlled movement on and over land, and on, over, and under water comprising, as defined in claim 1, said vehicle further comprising:

a means of managing and maintaining said vehicle's operations by exchanging various components;

wherein wings, tails, or outriggers of said vehicle may be replaced by other wings, tails, or outriggers, respectively, at will, to exchange said component with another;

wherein PJETs attached to said body or said wings may respectively be replaced by other PJETS, respectively, at will, to exchange said component with another;

wherein motive forces attached to said body, wings, tails, or outriggers, respectively, may be replaced by other motive forces, respectively, at will, to exchange said component with another;

wherein control agents attached to said body, wings, tails, or outriggers, respectively, may be replaced by other control agents, respectively, at will, to exchange said component with another.

* * * * *